Dec. 16, 1930. J. C. SMOOT 1,785,051
POWER TRANSMISSION
Filed July 20, 1927 2 Sheets-Sheet 2

Inventor
J. C. Smoot.
(Now by Judicial change of name J. C. Radnor.

By Clarence A. O'Brien
Attorney

Patented Dec. 16, 1930

1,785,051

UNITED STATES PATENT OFFICE

JESSE C. SMOOT, OF LINCOLNTON, NORTH CAROLINA, NOW BY JUDICIAL CHANGE OF NAME JESS COVINGTON RADNOR

POWER TRANSMISSION

Application filed July 20, 1927. Serial No. 207,225.

This invention relates to an improved power transmission mechanism between an automobile engine propeller shaft and a complemental differential.

The invention has more particular reference to the application of power to two perfectly aligned shafts, forming single shafts turning upon an axis which is perpendicular to the axis of the first named shaft, and has more precise reference to the application of power to the two axle shafts of the standard automobile, or the like, rear axle and differential assembly from a propeller or drive shaft.

The object is to provide means whereby the power and energy of the automobile engine may be applied to the axle shafts and rear wheels in two different ratios of gear reduction, which ratios may be arbitrarily selected and changed by means of a lever operated by the driver, and both of which shall be equally silent and free from vibration, to thereby enable the car to be run at a slower engine speed under ordinary use to produce a reduction in fuel consumption, and to provide a reduced gear ratio which will deliver more power to the rear wheels whenever such additional power is actually needed.

In the standard automobile, power is delivered to the rear axles and wheels through the medium of a transmission gear mechanism and propeller shaft. Gear reduction is accomplished through the employment of a counter-shaft and system of gears in the transmission gear housing. This device usually provides two or three gear ratios for the forward motion of the automobile, these being of a greater reduction in gear ratio than the direct drive, or so-called "high gear" power transmission directly from the engine to the ring gear on the differential.

The more powerful gear ratios are provided to enable the automobile to travel over hills and other constructions, which require more power than do ordinary roads of travel. The employment of the counter-shaft in the transmission gear box or housing, results in a grinding and undesirable noise which is objectionable and which often compels the driver to use a much more powerful gear ratio than the conditions require, and naturally this consumes more fuel than would be necessary with a slightly higher gear ratio.

The objectionable feature of employing the countershaft and gears to overcome more difficult progress has resulted in the manufacture of the standard automobile with the direct or "high gear" drive bearing such a low ratio to the axle shafts, as will permit the standard automobile to travel over a large variety of inclines without employing the countershaft and gears in the conventional transmission mechanism. Thus, while traveling upon a level road, the standard automobile engine is revolving at a higher rate of speed and delivering more power with a consequent greater fuel consumption than is necessary.

The present invention overcomes these difficulties by providing two different gear ratios which are both direct drives from the engine to the differential assembly, and which are independent of, and which may be operated without the employment of, the standard gear reduction devices in the usual transmission housing.

The invention makes possible two gear ratios, one slightly higher than the standard direct drive for ordinary level roadways, and a second direct drive slightly lower than the ordinary direct drive of standard automobiles. Both of these will be noiseless and free from vibration caused by the employment of the transmission gear box reduction gears.

The invention enables a car to travel over a great variety of roadways and inclinations of roadways with the power more accurately apportioned to the needs of the car than is possible with the standard transmission gear reduction devices.

The invention provides a lower gear ratio for difficult passage which is a direct drive and which is free from vibration and noise, as is inevitable when the standard transmission devices are employed for the same purpose.

The invention provides a higher gear ratio for level roadways than is practical in the standard automobile where the single direct drive must be sufficiently powerful to enable the automobile to operate over difficult and hilly conditions of roads.

The invention effects a saving in fuel consumption by providing a higher direct drive gear ratio and consequent lower engine speeds for level roadways.

The construction for accomplishing this dual direct drive, and for effecting the alleged advantages, will become more readily apparent from the following description and the accompanying drawings.

In the drawings:—

Figure 1:
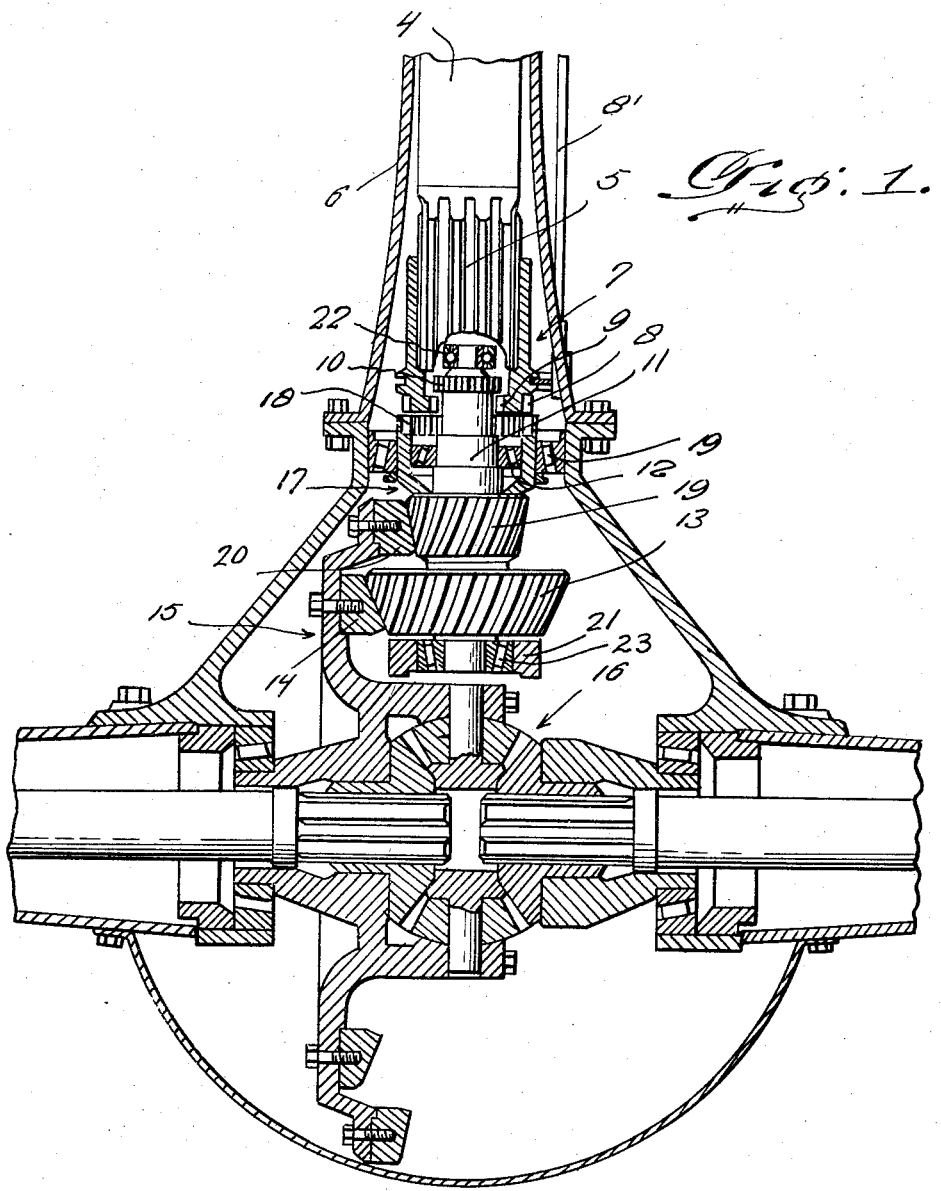
Figure 1 is a fragmentary elevational and sectional view showing the complete improved structure, as constructed in accordance with the present invention, the parts of the drive being in neutral position.

Referring to the drawings now, by reference characters, it will be observed that the reference character 4 represents generally an automobile engine propeller shaft, which is here shown with a reduced end formed into a propelling clutch member, designated by the character 5. As is usual, the propeller shaft is housed in an appropriate protective casing of the design represented. Mounted for longitudinal shifting motion within the large bell-like end of the casing 6 is a sliding sleeve or coupling 7 operated by the control rod 8. Incidentally, the control rod leads to an appropriate manipulating lever within reach of the driver. This sleeve 7 is provided with internal clutch teeth in constant mesh with the teeth or splines of the clutch member 5.

Also at the rear end, the said sleeve is provided with an external clutch member 8 and an internal clutch member 9, these being of the configuration disclosed.

The internal clutch member 9 is adapted to mesh with an external clutch member 10 which is formed upon the forward end, and is an integral part, of a solid driven shaft 11, the rear end of which is formed into a bevel pinion gear 13 which is in constant mesh with a comparatively small ring gear 14 fastened upon a rotary disk 15 which has driving connecting with an ordinary differential designated generally by the reference character 16. The shaft 11 is journaled for rotation in appropriate bearings 12 and 21. The rear bearing 21 is based in a projection of the "bell-housing" of the differential assembly, and is rigidly attached to the differential assembly.

Figure 2:
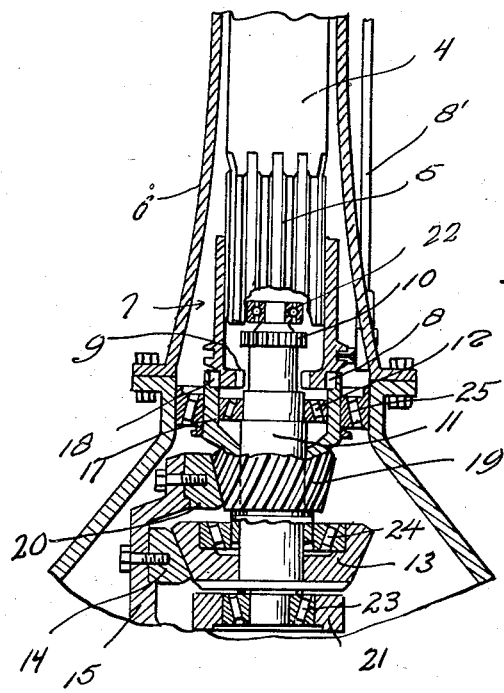
Figure 2 is a similar view showing the elements of the structure arranged in what may be referred to as the third speed drive, wherein the ratio is approximately five to one, that is five revolutions of the propeller shaft to one revolution of the axle shafts.

Surrounding the solid shaft 11 is a tubular shaft 17 having an internal annular clutch member 18 adapted to mesh with the clutch member 8. This tubular shaft 17 carries, at its rear end, a relatively small pinion gear 19 which is in constant mesh with a proportionately large ring gear 20, also carried by the disk 15. The tubular shaft 17 is supported at its forward end by the bearing 23. The rear end is supported by a bearing 24 built within the large pinion gear 13, which pinion gear is supported as aforementioned by the bearing 21 based upon a projection of the bell-housing for the differential. A projection of the tubular shaft 17 beyond the small pinion gear 19 fits into the inner cone of the aforementioned bearing 24, whereby the said bearing 24 supports the rear end of the shaft 17 in the same axis of rotation as the solid shaft 11. The shafts 11 and 17 rotate upon the same axis and are supported in bearings one upon the other, the system of bearings being based at the circumference at the forward end and at the center at the rear end. The built-in bearing 24 is disclosed in Figure 2.

Sufficient clearance is maintained between the inner wall of the tubular shaft 17 and the periphery of the solid shaft 11 as to permit the two shafts to rotate free of each other.

The propeller shaft 4 is supported at its extreme rear end by a small radial bearing of suitable size which is carried upon a projection of the solid shaft 11. This bearing is designated by the character 22 in the drawings.

As before stated, the parts shown in Figure 1 are in a relationship known as neutral. It is obvious, however, that by shifting the rod 8, the sliding sleeve clutch member 7 may be moved from neutral into the position shown in Figure 2, which is known as the "third speed drive". In this position, the clutch member 8 is brought into mesh with the complemental clutch member 18, thus setting the pinion 19 into rotation for co-operation with the large ring gear 20.

Figure 3:
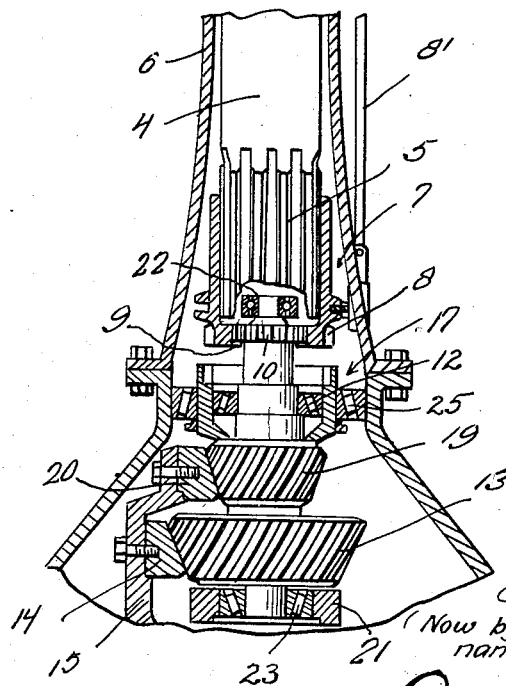
Figure 3 is also a view like Figure 2, showing the fourth speed drive position, wherein the ratio is approximately three to one.

In this arrangement, the sliding sleeve gear is in suspended position. However, it may be retracted as shown in Figure 3, whereupon, the internal clutch member 9 will be brought into mesh with the clutch member 10 to drive the solid or inner shaft 11. This in turn, drives the large pinion 13, which is in mesh with the smaller ring gear 14, thus producing a higher rate of speed at the axle shafts with the same rate of speed at the propeller shaft.

From the foregoing, it will be seen that I have evolved and produced an improved power transmission drive to the differential assembly of any automobile, embracing a conventional differential proper, but using two pinion gears of different sizes engaging with two gear rings of different diameters mounted upon a driving disk constituting a part of the revised differential. The two pinion shafts, both the inner solid shaft and the outer tubular shaft, rotate upon the same axis and are free of each other. The rear end of the conventional propeller shaft is splined and a sliding sleeve fits over this end and transmits power to either of the two pinion gears, according to the position of the shifting rod.

The tubular shaft drives the disk 15 at an approximate rate of five revolutions of the propeller shaft to one revolution of the disk; while the solid shaft 11 drives at the approximate ratio of three to one.

As before indicated, the object of the device is to secure two speeds to the rear axles that are direct drives that do not employ the counter-shaft gears in the transmission, and which provide a means of reducing engine speed and fuel consumption through a higher gear ratio where excess power is not needed and another speed which is a lower gear ratio with more pulling force which is equally a part of the conventional high gear in automobiles.

The two gear ratios, may of course, be arbitrarily fixed at any combination desired. The gist of the invention is in the use of two pinions and complemental solid and tubular shafts, wherein these shafts have independent operation and may be selectively coupled to the propeller shaft; the propeller shaft as well as the driving tubular and solid shafts, rotating about the same axis.

Having thus described my invention, what I claim as new and novel is:—

1. In a power transmission construction of the class described, a housing, a pair of axle shafts supported therein, a standard differential mechanism including a driving disc having inner and outer concentric ring gears, a propeller shaft associated with the front end of the housing, a solid driven inner pinion shaft disposed in alignment with said propeller shaft, a pair of longitudinally spaced bearing assemblies in which the opposite end portions of said solid shafts are mounted for rotation, a relatively large pinion gear fastened on said solid shaft and in driving mesh with the inner ring gear, a roller bearing structure mounted in said housing, an outer tubular shaft surrounding and rotatable on said inner solid shaft, said tubular shaft having its front end mounted for rotation in said roller bearings, a relatively small pinion gear carried by the tubular shaft and in mesh with the outer ring gear, an additional roller bearing structure mounted within the front end portion of the tubular shaft, said solid shaft being mounted for rotation in said last-named bearing, said relatively large pinion gear having a recess defining a cavity, and an end thrust bearing arranged in said cavity and receiving the rear end of said tubular shaft, the forward ends of the inner and outer shafts having independent driving teeth, a sliding collar splined for longitudinal sliding motion on said propeller shaft, operating means for adjusting said collar, said collar being provided with internal and external driving teeth adapted to be selectively meshed with the driving teeth of either the inner solid shafts or the outer hollow shaft.

2. In a power transmission mechanism for a standard automobile, the combination of a housing, a pair of axle-shafts located therein; a standard differential mechanism having a driving disc supporting two concentric ring-gears, an outer tubular pinion shaft, an inner pinion equipped solid shaft, said pinions being in constant mesh with said ring gears, the forward end of the solid shaft being provided with external teeth, the forward end of the tubular shaft being fitted with internal teeth, a splined sleeve sliding longitudinally upon a propeller shaft and provided with internal and external driving teeth adapted to selectively mesh with the aforesaid internal and external teeth, means to slide the sleeve into driving engagement with either set of teeth on the tubular or solid shaft, a tapered roller bearing fitting into the inner side of the forward opening of the differential housing, the forward end of said tubular shaft being supported in said tapered roller bearing, a smaller tapered roller bearing fitted inside of the said tubular shaft at its forward end and supporting said solid shaft, a projection on the rear end of said solid inner shaft, a tapered roller bearing on said projection, said tapered roller bearing having rollers and cones arranged to take the thrust of said solid inner shaft and to act as a complementary thrust bearing to the aforesaid taper roller bearing inside the forward end of aforementioned tubular shaft at its end to carry the forward end of said inner solid shaft, the large pinion gear on said inner solid shaft having recessed from its forward surface a cavity to accommodate and carry a tapered roller bearing, a tapered roller bearing within said cavity and supporting the rear end of said tubular shaft, said tapered roller bearing having rollers so arranged as to take the thrust of said tubular shaft and complementary to the aforementioned tapered roller bearing fitted to the inner surface of the forward opening in the bell-shaped housing.

In testimony whereof I affix my signature.

JESSE C. SMOOT.